B. H. OENNING.
TRAP NEST.
APPLICATION FILED APR. 28, 1916.
1,198,756.
Patented Sept. 19, 1916.
3 SHEETS—SHEET 2.
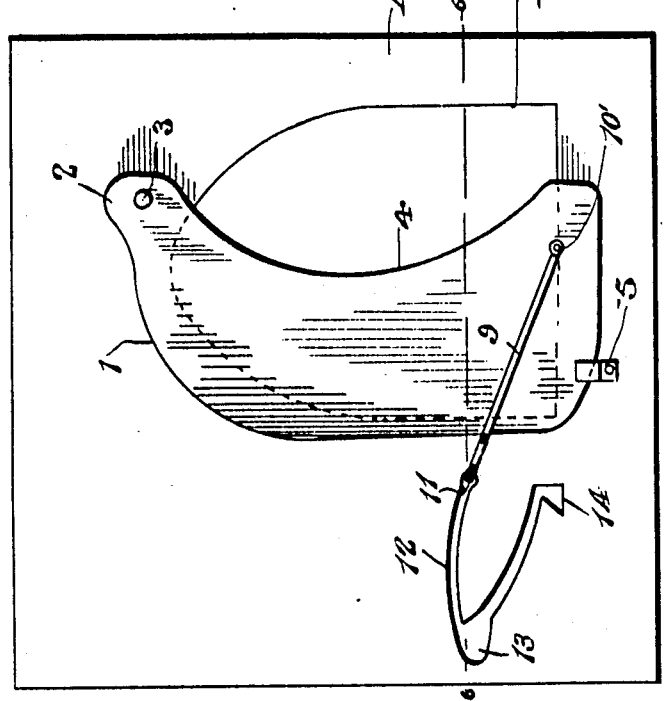
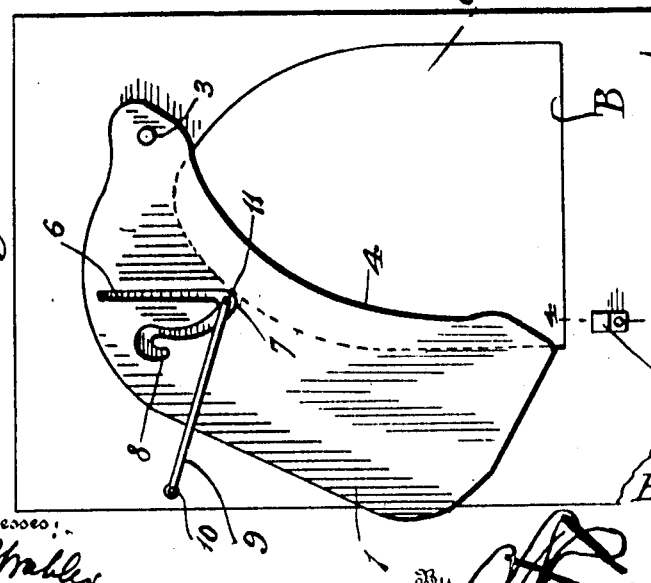
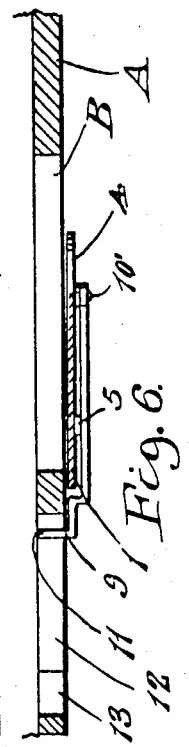
Inventor
B.H. Oenning.

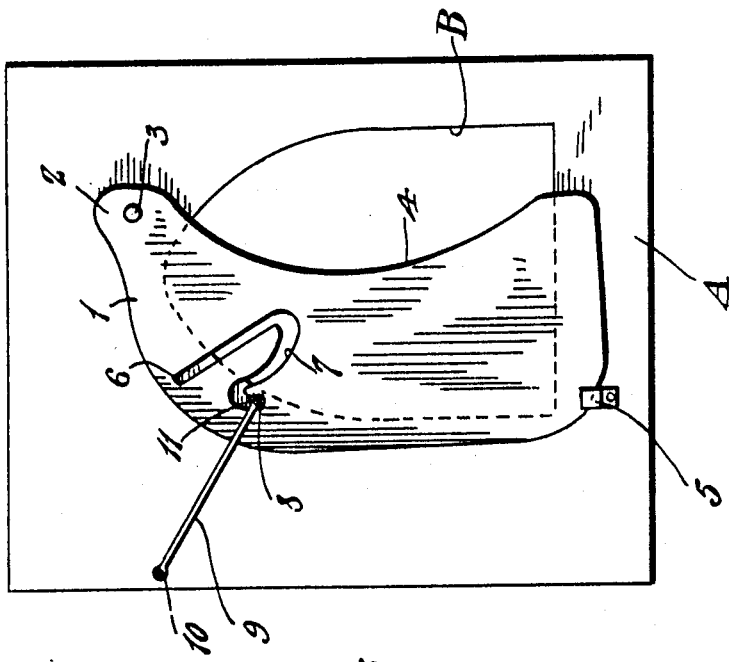
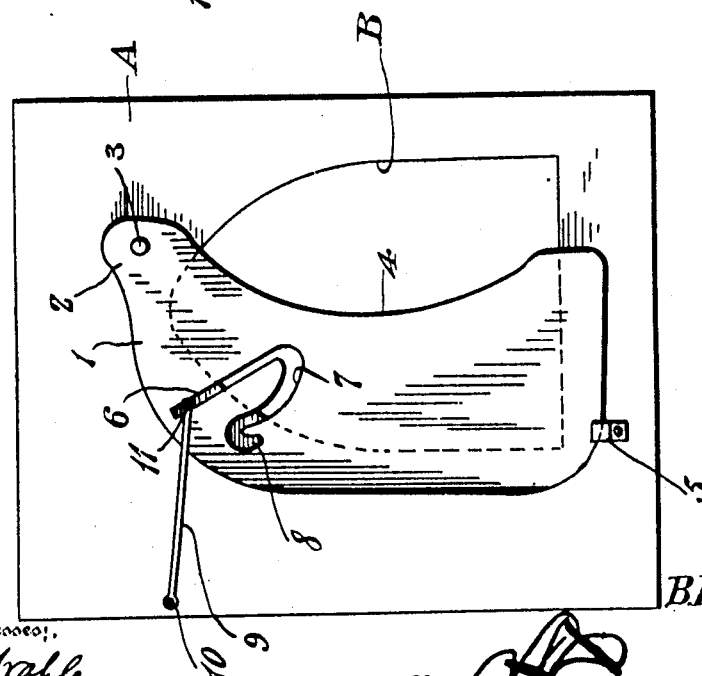

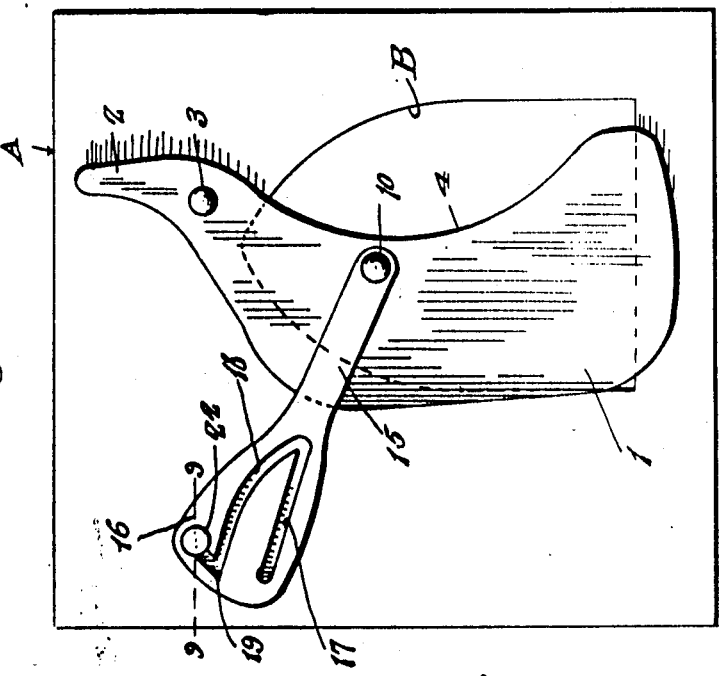
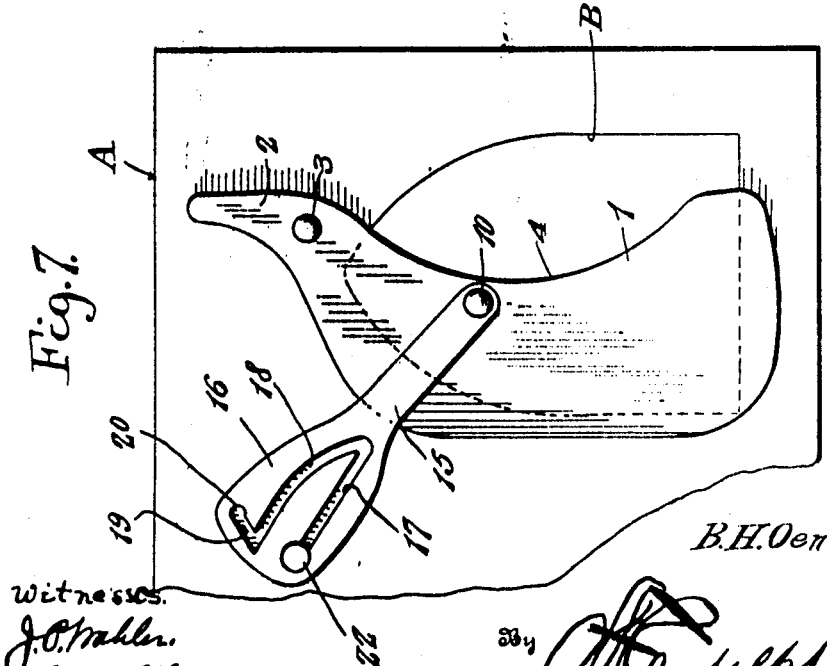

UNITED STATES PATENT OFFICE.

BARNEY H. OENNING, OF UNIONTOWN, WASHINGTON.

TRAP-NEST.

1,198,756.

Specification of Letters Patent.

Patented Sept. 19, 1916.

Application filed April 28, 1916. Serial No. 94,163.

*To all whom it may concern:*

Be it known that I, BARNEY H. OENNING, a citizen of the United States, residing at Uniontown, in the county of Whitman and State of Washington, have invented certain new and useful Improvements in Trap-Nests; and I do hereby declare the following to be a full, clear, and exact description of the invention, such as will enable others skilled in the art to which it appertains to make and use the same.

The primary object of this invention is to provide a novel type of trapping mechanism designed to be associated with a nest so as to prevent the escape of a hen from the nest when it is desired to confine the hen thereon, and also to prevent the entrance of other poultry while the nest is being occupied.

Another object of the invention is to provide a trapping mechanism for carrying out the above object, which will be of simple and durable construction and efficient in operation.

Other objects will appear and be better understood from that embodiment of my invention of which the following is a specification, reference being had to the accompanying drawings forming a part thereof, in which:

Figure 1 is a front elevation of the trapping mechanism for the nest, showing the trapping mechanism in a position to admit of the passage of the poultry through the entrance opening in the stationary element. Fig. 2 is a view showing the door locked in operative position, Fig. 3 is a view showing the locking mechanism for the door being moved to operative position during the closing of the door, Fig. 4 is a detail vertical section, taken on the line 4—4 of Fig. 3, Fig. 5 is a front elevation of the nest, showing a modified form of locking mechanism for the door, Fig. 6 is a horizontal section, taken on the line 6—6 of Fig. 5, Fig. 7 is a front elevation of another modified form of trapping mechanism, and showing the door unlocked, Fig. 8 is a front elevation of the construction shown in Fig. 7 with the door locked in closed position, Fig. 9 is a section taken on the line 9—9 of Fig. 8, Fig. 10 is a top plan view of the locking mechanisms shown in Figs. 7 and 8.

Referring to the drawings in detail, the letter A designates a stationary element which is adapted to form one wall of a nest, and is provided with an entrance opening B, the said entrance opening B being designed to be partially closed by means of a movable element 1, which is adapted to provide a door, and includes an elongated vertically disposed body having its upper end provided with an extension 2, located to one side of the door, and which extension has pivotal connection with the wall A by means of a pivot pin 3. The door 1 only partially closes the opening B, and by virtue of the manner of pivoting the door to the wall, the door will gravitate to closed position upon being released from open position. The door has that side edge which extends across the opening B provided with a semicircular cut-out portion 4, which admits of the poultry inserting their heads through the opening B and moving the door to open position when the door is unlocked. In Figs. 1 to 6, inclusive, the lower end of the door 1 is operable through a guide 5 mounted on the adjacent wall of the housing, and which serves to prevent outward movement of the lower end of the door 1. In Figs. 1 to 4, inclusive, the door 1 is provided adjacent its upper end, with a substantially V-shaped slot having a supporting branch 6, and an upwardly and inwardly curved guiding branch 7, the upper end of the guiding branch 7 communicating with a downwardly directed locking notch 8. Another movable element consisting of a rod 9 has one end pivoted to the wall A, as shown at 10, and its opposite end bent angularly to provide a locking element or tongue 11. When it is desired to unlock the door so as to admit of the passage of a hen through the opening B the rod 9 is raised so that the tongue 11 will lie in the branch 6 of the slot and be supported therein, as shown in Fig. 1. During the passage of the hen through the opening B, the door 1 will be swung on the pivot 3, causing the tongue 11 of the rod 9 to descend to the lower end of the branch 6, as shown in Fig. 3. When the door is released and moved to closed position, the tongue 11 will be drawn upwardly in the branch 7 and enter the notch 8 and lock the door against movement.

In the modification shown in Figs. 5 and 6 the rod 9 has one end pivoted to the door 1 at 10' and its opposite end operable in a horizontally disposed and substantially V-shaped slot 12, formed in the wall A at a point spaced from the door opening B and the apex of the V-shaped slot is enlarged, as shown at 13, and the lower branch of the V- shaped slot communicates with the locking notch 14. In this construction the tongue 11 on the rod 9 is placed in the upper branch of the slot 12, when the door is set for movement, and upon movement of the door to open position the tongue 11 will travel toward the apex end of the V-shaped slot and descend and aline with the lower branch of the slot so that during the closing of the door the tongue 11 will travel toward the inner end of the branch and enter the locking notch 14 and lock the door against movement.

In Figs. 7, 8, 9 and 10, instead of employing the guide 5 the upper end of the door is extended approximately to the upper end of the stationary element or wall A and provides means for protecting the lower end of the door from being pushed outwardly. In the construction shown in these figures an elongated flat arm 15 is substituted for the rod 9 and has one end pivoted to the door and its opposite end enlarged, as shown at 16, and provided with a substantially V-shaped slot having a straight branch 17 and a slightly curved branch 18, the free end of the latter branch communicating with a notch 19 which extends substantially at an acute angle to the curved branch 18 and has its outer end enlarged, as shown at 20. A stud 21 is mounted on the wall A, at a point spaced from the opening B, and is adapted to be interchangeably received by the branches 17 and 18 of the slot. The head 22 is mounted on the outer end of the stud 21 and engages the outer side of the arm 15, and spacing plates 23 are interposed between the arm and the wall A and are secured in place by means of the stud 21. When the arm is in the position shown in Fig. 7, and the stud 21 is received by the straight branch 17 of the V-shaped slot in the door, the door will be unlocked and can be opened by the poultry in the manner before described. When the door is being moved to open position the arm 15 will be moved upwardly so as to present the apex end of the V-shaped slot to the stud 21. When the door is returning to closed position the stud 21 will enter the branch 18 of the V-shaped slot and when the door has reached its lowermost position the stud 21 will aline with the notch 19 so that the enlarged end of the arm will drop and cause the enlarged end 20 of the notch 19 to receive the stud 21 so as to lock the door against movement.

Having thus described my invention what I claim as new, is:

1. A trapping structure for a nest comprising a stationary element and a pair of movable elements, one of the latter elements having pivotal connection with the first-mentioned element and adapted to obstruct passage to and from the nest, one of the elements having a V-shaped slot therein, one wall of one of the branches of the slot having a notch therein, and means carried by the other of the elements and constantly engaged in said slot during movement of the obstructing element to operative or inoperative position and directed by one branch of the slot into the notch after the obstructing element has moved to operative position.

2. In a trapping structure for a nest, the combination with a wall having an entrance opening therein and a door for closing the opening, of an arm having one end connected to the door and its opposite end provided with a V-shaped slot, one of the branches of the slot having one wall thereof provided with a notch, means carried by the walls adapted to be received by the other branch of the slot during opening of the door and to be received by the first-mentioned branch during closing of the door and to engage in the notch when the door has been moved to closed position.

In testimony whereof I affix my signature in presence of two witnesses.

BARNEY H. OENNING.

Witnesses:
 JNO. A. DRIESSEL,
 M. REISENAUER.

Copies of this patent may be obtained for five cents each, by addressing the "Commissioner of Patents, Washington, D. C."